(12) United States Patent
Zimmerman

(10) Patent No.: US 7,806,951 B2
(45) Date of Patent: Oct. 5, 2010

(54) MOBILE AIRBORNE CONTAMINANT CONTROL CHAMBER

(75) Inventor: Timothy P. Zimmerman, Ft. Erie (CA)

(73) Assignee: NIF Solutions Corp., St. Catherine's, ON (CA)

( * ) Notice: Subject to any disclaimer, the term of this patent is extended or adjusted under 35 U.S.C. 154(b) by 346 days.

(21) Appl. No.: 12/012,539

(22) Filed: Feb. 4, 2008

(65) Prior Publication Data

US 2008/0184889 A1 Aug. 7, 2008

Related U.S. Application Data

(60) Provisional application No. 60/899,480, filed on Feb. 5, 2007.

(51) Int. Cl.
*B08B 15/00* (2006.01)
*B08B 15/02* (2006.01)
*B60P 1/00* (2006.01)
*B60P 1/60* (2006.01)

(52) U.S. Cl. .......................... 55/356; 55/385.2; 55/473; 55/485; 55/318; 55/472; 95/10; 95/15; 95/22; 95/214; 95/273; 96/401; 96/420; 96/421; 134/111; 406/41; 454/187; 454/195; 454/341; 454/357; 454/903; 454/236; 454/238; 454/49

(58) Field of Classification Search .................. 55/356, 55/385.2, 473, 485, 318, 472; 454/187, 195, 454/341, 357, 903, 236, 238, 49; 95/10, 95/15, 22, 214, 273; 96/401, 420, 421; 134/111; 406/41
See application file for complete search history.

(56) References Cited

U.S. PATENT DOCUMENTS

| 1,731,593 | A |   | 10/1929 | Russell |
|-----------|---|---|---------|---------|
| 1,982,470 | A |   | 11/1934 | Franks |
| 3,470,680 | A |   | 10/1969 | Avera |
| 4,323,377 | A |   | 4/1982  | Jolin |
| 4,909,815 | A |   | 3/1990  | Meyer |
| 5,067,856 | A | * | 11/1991 | Sisk ............................. 406/41 |
| 5,090,972 | A |   | 2/1992  | Eller et al. |
| 5,417,729 | A | * | 5/1995  | Greenleaf, Sr. ............ 55/350.1 |
| 5,522,919 | A | * | 6/1996  | Sargent et al. ................ 95/273 |
| 5,588,985 | A | * | 12/1996 | Shagott et al. ................. 95/25 |
| 5,762,664 | A | * | 6/1998  | Vross et al. .................... 55/319 |
| 5,997,619 | A |   | 12/1999 | Knuth et al. |
| 6,022,389 | A | * | 2/2000  | Vross et al. ................. 55/315.1 |

(Continued)

FOREIGN PATENT DOCUMENTS

EP 0 445 722 A3 9/1991

*Primary Examiner*—Robert A Hopkins
*Assistant Examiner*—Minh-Chau T Pham
(74) *Attorney, Agent, or Firm*—Simpson & Simpson, PLLC

(57) ABSTRACT

The present invention is a mobile air contaminant control system that includes a filter assembly enclosed by a mobile outer chamber. The filter assembly is tapered to create a large volume air way downstream from the filter assembly that enables more even air flow and filter loading. One or more exhaust fans pull the air through the filter assembly and exhaust it to the exterior of the chamber. The system is functionally attached to an exterior structure having at least one air intake and housing a work piece. As airborne contaminants are generated from the work piece(s), the control system exhausts them from the exterior structure through the filter assembly and into the external environment.

27 Claims, 9 Drawing Sheets

U.S. PATENT DOCUMENTS

| | | | |
|---|---|---|---|
| 6,332,308 B1 * | 12/2001 | Miller | 55/385.5 |
| 6,402,613 B1 | 6/2002 | Teagle | |
| 6,569,217 B1 | 5/2003 | DeMarco | |
| 6,640,382 B1 | 11/2003 | Williams et al. | |
| 6,966,937 B2 | 11/2005 | Yachi et al. | |
| 7,156,889 B1 | 1/2007 | Swanson et al. | |
| 7,258,728 B2 * | 8/2007 | Lim et al. | 95/287 |
| 7,662,198 B2 * | 2/2010 | Jansen et al. | 55/337 |
| 2004/0211162 A1 | 10/2004 | Henrikson | |
| 2007/0187317 A1 | 8/2007 | Graetz et al. | |
| 2009/0308254 A1 * | 12/2009 | Oakham | 96/423 |

* cited by examiner

MOBILE AIRBORNE CONTAMINANT CONTROL CHAMBER

CROSS-REFERENCE TO RELATED APPLICATIONS

The present application claims benefit under 35 U.S.C. §119(e) of U.S. Provisional Patent Application Ser. No. 60/899,480 filed Feb. 5, 2007 which application is hereby incorporated by reference in its entirety.

FIELD OF THE INVENTION

The present invention pertains to devices for controlling airborne contaminants, specifically to contaminants generated during servicing operations, and more specifically to mobile contaminant control devices.

BACKGROUND OF THE INVENTION

It is often a problem to clean and/or repaint large items ("work pieces") such as locomotive engines and airplanes. Such operations usually involve sand blasting, spraying paint and solvents over an item, device, or piece of equipment having a large surface, thereby depositing solid waste over a large area of the building that houses the work piece and also expelling airborne contaminants into the atmosphere. The amount of solid waste generated can render the spraying area unusable for a long period of time, if not permanently. Regarding airborne waste, it is well known that unpermitted delivery of airborne contaminants into the atmosphere fouls the air and is against the law.

Often this problem is addressed by transporting the work piece to a permanent cleaning/painting facility equipped to clean and/or paint the work piece and to handle the waste generated when it is serviced. However, this puts the work piece out of commission not only for the cleaning period but also for the transport period. This can lead to additional expense over and above the actual cost of cleaning or painting as transport of such items is expensive and may require the purchase of backup equipment to maintain operations. It would be advantageous to provide the equipment and processes needed for the service and maintenance of work pieces, especially large work pieces, without moving them from their principal or operational locations to reduce both the cost and the downtime generated during the cleaning/painting operation.

There have been previous attempts to solve this problem. U.S. Pat. No. 7,156,889 to Swanson, et al. discloses a mobile assembly for removing dust from a gas stream. The entire assembly is mounted on a trailer, such as a semi trailer, and includes an extendable/retractable portion that incorporates a flexible air tunnel with collapsible dust bags at one end. The assembly also includes ventilation fans. The primary gas intake extends transversely from between a two part filter system so that when entering the filters the air or gas flow is divided and must turn perpendicularly to the path of air entering the intake. Moreover, the Swanson patent is used to remove dust from industrial collectors and is designed to clean large items left in place in their primary locations.

U.S. Pat. No. 6,402,613 to Teagle is a portable environmental control system used to evacuate gases from an interior space in a building. The unit is placed in an adjoining room with a blower unit positioned between a flexible intake duct and a flexible outlet duct that is directed to a filter unit or the outside air. The intake duct is fitted into an opening to the target room and contaminated air is removed to the filter or outside through the blower. The filter system of the Teagle device as well as the position of the blower in relation to the filter does not enable it to be used to evacuate large volume structures such as plane hangers, locomotive maintenance sheds, and similar large enclosures.

U.S. Pat. No. 4,909,815 discloses a mobile air cleaning apparatus for use within auto body shops. It possesses a C shape with a base having an air intake, an upright column with filters and a fan, and an overhanging hood which expels filtered air. The apparatus is designed to be placed over a relatively small area, in which air contaminants are generated, such as a car hood being sanded or painted. The filtered air is recirculated over the target area to take up additional contaminants to be carried to the filters. However, the apparatus is limited to recirculating air and does not remove contaminants from the work area or building housing the work area.

U.S. Pat. No. 4,323,377 to Jolin discloses a mobile dust collector that utilizes a series of filter cartridges that lead to a conical dust hopper. Although the device is mounted on a trailer frame, the entire unit must be rotated to a vertical position to enable the dust hopper to catch dust dropping from the filters. An intake duct is connected to the unit and air is forced over the filters which catch the dust on the outside of the filter while filtered air is expelled though the filter to the environment. The Jolin dust collector does not allow for large intake systems that allow for removal of contaminants from large buildings.

U.S. Pat. No. 6,569,217 to DeMarco is a mobile dust collector that utilizes a cyclone separator to separate large and small dust particles. The finer dust particles are filtered and collected in one or more dust bins. Similar to the Jolin apparatus discussed above, the DeMarco dust collector lacks the ability to be adapted to seal doors and similar sized openings to remove contaminants directly from enclosures.

U.S. Pat. No. 5,090,972 to Eller, et al. discloses an environmental control system used to remove hazardous materials from a work area. However, the disclosed system is not mobile and requires different configurations of inlet and outlet ducts for each job site.

Thus, there is a need in the field for a mobile device or system that is self contained and able to move large volumes of air through structures housing large work pieces with the aim of generating an air flow around the work piece to carry contaminated air to the mobile filtering system.

SUMMARY OF THE INVENTION

The present invention broadly comprises a mobile airborne contaminant control system comprising an outer chamber that includes a front wall, a roof, a floor and at least two side walls and possessing a fan end and a door end opposite the fan end. The outer chamber encloses an intake filter system assembly that includes a top filter, a plurality of side filters, at least two of the plurality of side filters attached to the top filter and at least two of the plurality of side filters contacting the floor of the outer chamber, and a back filter opposite the door end and functionally attached to the top filter and the plurality of side filters. The intake filter system includes a tapered shape with the narrow end of the tapered shape proximate to the back filter and the wide end of the tapered shape proximate to the door end. The mobile airborne contaminant control system also includes at least one airway formed between the intake filter system and the outer chamber, at least one fan, with the at least one fan located between the back filter and the fan end, at least one air exhaust system extending from at least one of the at least one fan and directing exhaust air from the at least one fan to the exterior of the outer chamber. At least two wheels are operatively connected to the floor of the chamber.

In a preferred embodiment, the mobile airborne contaminant control system also includes an exterior structure functionally attached to the outer chamber. In a more preferred embodiment, the functional attachment between the exterior structure and the outer chamber is a seal.

The present invention also broadly comprises a method for controlling airborne contaminates from a work piece that includes functionally attaching an airborne contaminate control chamber to an opening of an exterior structure wherein the exterior structure includes at least one air intake, transferring the work piece into the exterior structure, operating at least one fan of a control chamber to generate an air flow from outside the exterior structure into the control chamber having a filter assembly, moving the air flow though the top and side filters of the filter assembly into at least one airway, and directing the air flow from the at least one airway through the at least one fan to the exterior of the control chamber and the exterior structure. The control system includes an outer chamber including a front wall, a roof, a floor and at least two side walls and possesses a fan end and a door end opposite the fan end. The outer chamber encloses an intake filter system that includes a top filter, a plurality of side filters, at least two of the plurality of side filters attached to the top filter and at least two of the plurality of side filters contacting the floor of the outer chamber, and a back filter opposite the door end and functionally attached to the top filter and the plurality of side filters. The intake filter system includes a tapered shape with the narrow end of the tapered shape proximate to the back filter and the wide end of the tapered shape proximate to the door end. The mobile airborne contaminant control system also includes at least one airway formed between the intake filter system and the outer chamber, at least one fan, the at least one fan located between the back filter and the fan end, at least one air exhaust system extending from at least one of the at least one fan and directing exhaust air from the at least one fan to the exterior of the outer chamber, and at least two wheels operatively connected to the floor.

One object of the invention is to provide a mobile system and method for reducing the amount of airborne particulates generated during a maintenance and service operation on objects or work pieces, such as airplanes, locomotives, tanks, and similar pieces of equipment.

A second object of the invention is to reduce the time and expense of performing maintenance and service operations on workpieces.

A third object of the invention is to decrease the downtime of such workpieces caused by the transport of the workpiece (s) to a maintenance site.

BRIEF DESCRIPTION OF THE SEVERAL VIEWS OF THE DRAWINGS

The nature and mode of the operation of the present invention will now be more fully described in the following detailed description of the invention taken with the accompanying drawing Figures, in which.

DETAILED DESCRIPTION OF PREFERRED EMBODIMENTS OF THE INVENTION

At the outset, it should be appreciated that like drawing numbers on different drawing views identify identical structural elements of the invention.

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Figure 1:
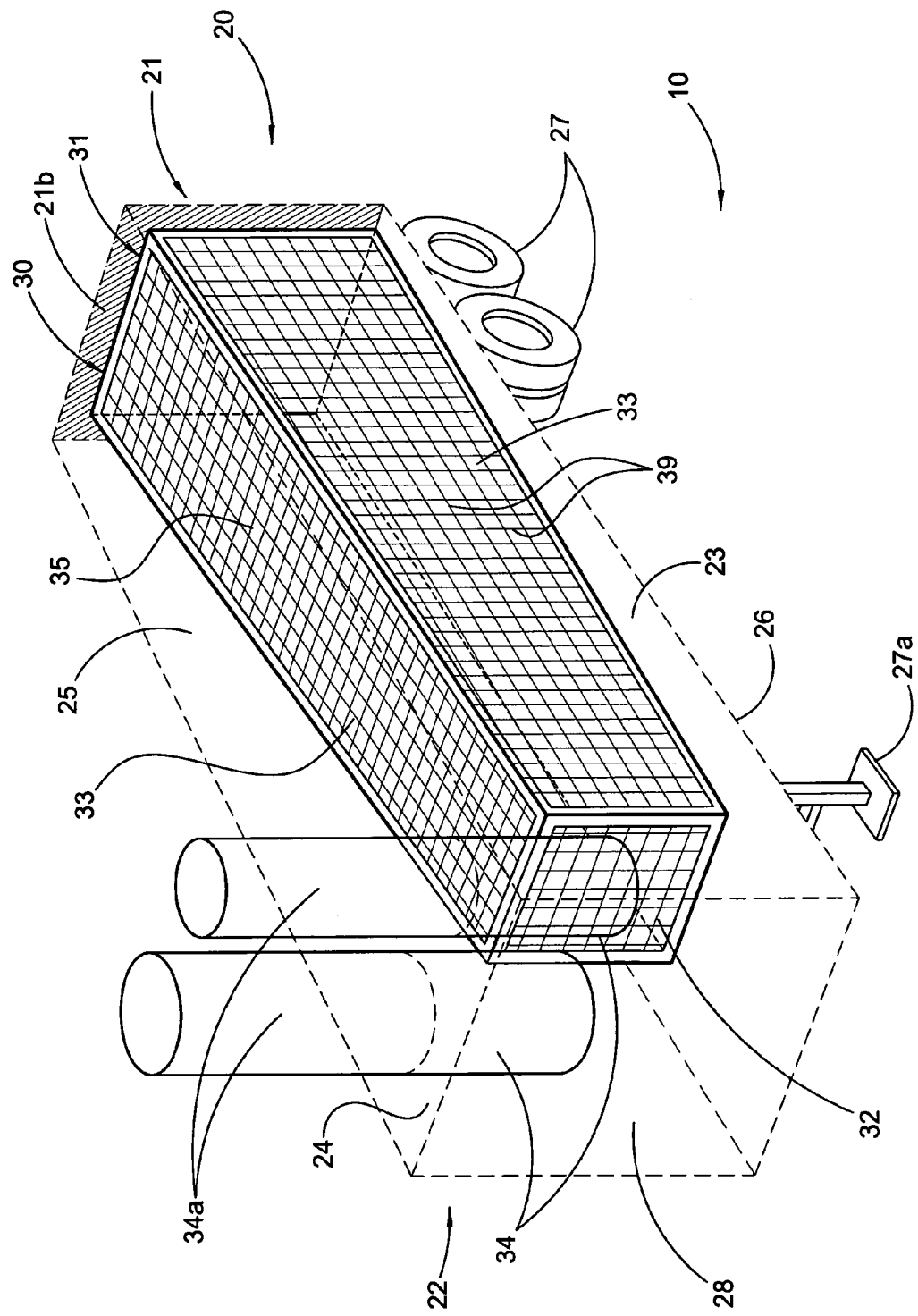
FIG. 1 is a top perspective schematic view of mobile airborne contaminant control system of the present invention.

FIG. 1 is a top perspective view of mobile airborne contaminant control chamber 10 ("control system 10"). Outer chamber 20 is seen in shaded lines and encloses air intake filter assembly 30. In the embodiment shown, outer chamber 20 is in the form of a semi trailer. Door end 21 of chamber 20 is proximate the door of the trailer and, as explained below, is proximate the intake end of air intake filter assembly 30. Fan end 22 is opposite from door end 21 and is proximate intake fans 34. Outer chamber 20 includes sidewalls 23, roof 25, floor 26, and front end 28. Wheels 27 are operationally attached to floor 26. By operatively attached is meant that a first component or device is attached either directly or indirectly to a second component or device in such a manner as to cause either or both of the first and second components to function. For example, as described above, wheels 27 is described as operatively attached or operationally attached to floor 26 in such a way that when wheels 27 turn, outer chamber 20 will move, thereby becoming mobile.

Air intake filter assembly 30 ("filter assembly 30") includes intake 31 proximate door end 21 of outer chamber 20. Filter assembly 30 includes top filter 35 and at least two side filters 33. It will recognized by persons skilled in the art that both top filter 35 and side filters 33 may be comprised of several sections to form a single top or side filter.

Side filters 33 are attached to top filter 35 to form a single structure. Such attachment may be by welding, nut and bolt assemblies, screws, nails, and similar devices well known t those having skill in the art. In a preferred embodiment, sidewalls 33 contact floor 26 of outer chamber 20. In one embodiment, filter assembly 30 rests on floor 26. In an alternate embodiment, filter assembly 30 is attached to floor 26 by welding, nails, nut and bolt assemblies or other suitable attachment devices. Grid 39 extends across side filters 33, top filter 35, and back filter 32 to provide support for the filter media of each of those filters. In one embodiment, grid 39 is fabricated from ¼ inch diameter metal rods although different sizes may be used to adapt to different conditions. In the embodiment shown, filter assembly 30 is straight meaning the air stream entering filter assembly 30 moves through filter assembly 30b in a straight path with no turns until it exits through the various filters. The straight embodiment provides the advantage of moving the air using less energy and removing possible pockets of contaminant deposit in air flow path turns upstream from the filters.

Fans 34 are located toward the fan or front end 28 of outer chamber 20 and act to draw contaminated air and/or fresh air through the filters toward and then through stacks 34a to the exterior of outer chamber 20. Although FIG. 1 shows two fans, in smaller embodiments of chamber 20 described below, one fan may be sufficient. In alternate embodiments, three or more fan systems may be used. Fans 34 may be the same or different capacity depending on the air flow requirements. In one embodiment, fans 34 are tube axial fans with a variable pitch such as a BFA-34VP-050 34 inch tube axial fan from Industrial Hose and Hydraulics, Ltd. in Hamilton, Ontario Canada.

Figure 2:
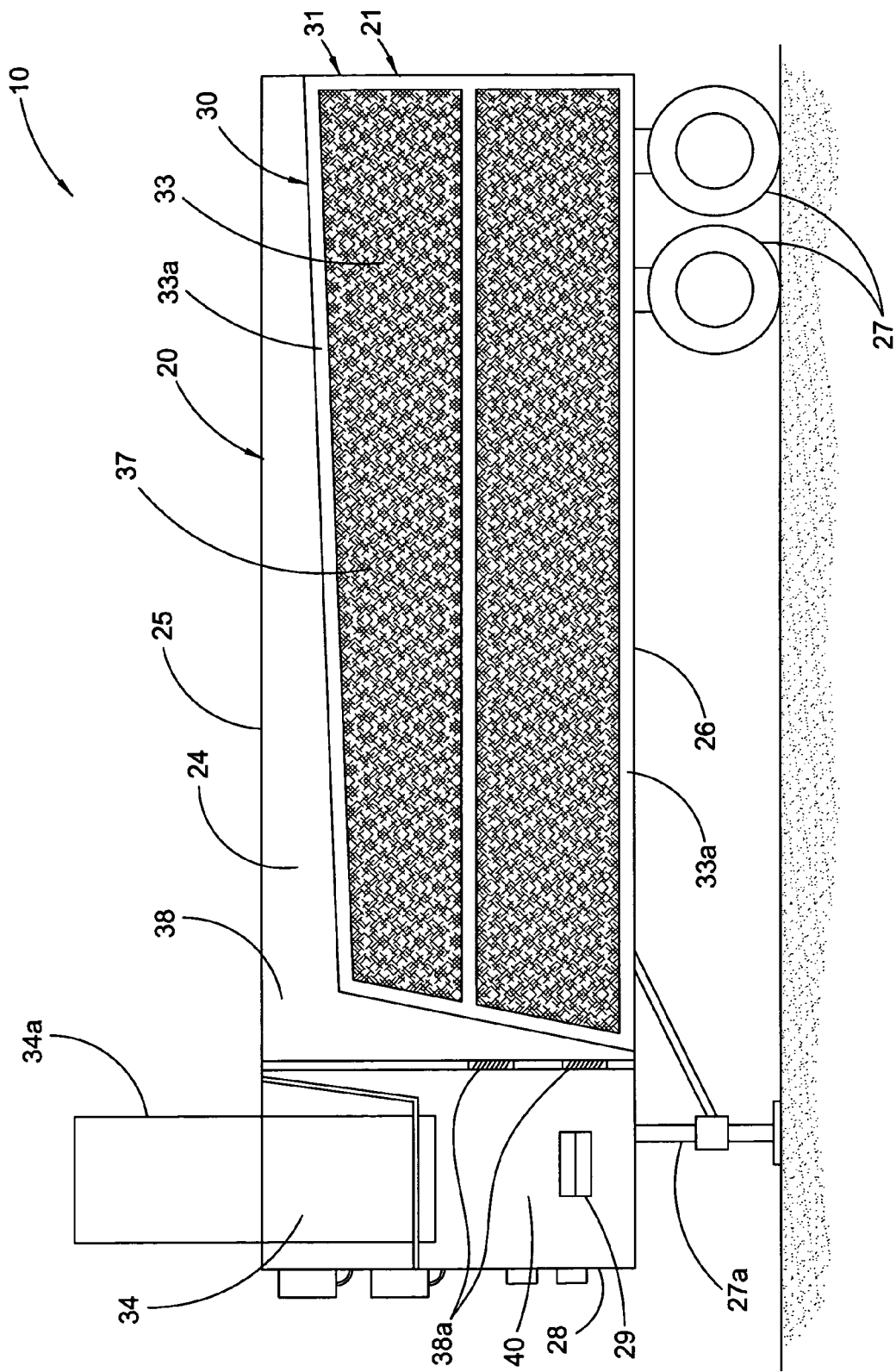
FIG. 2 is a side view of the control system of the present invention depicting one embodiment of the structure of a filter sidewall.

FIG. 2 is a side view of control system 10 depicting one embodiment of the structure of a filter sidewall 33. Sidewall 33 is in the form of a frame that supports filter media 37 ("filter 37"). In a preferred embodiment, a metal grid (not shown) is attached between the frame supports of frames 33a and also acts as backing for filter 37 to enable it to maintain its shape and integrity while air currents flow through it to fan(s) 34. Frames may be fabricated from angle iron, rectangular metal tubing, lumber, and other suitable materials. In some embodiments, filter media may range from greater than zero microns to about 10 microns. Filter media rated at 5 microns with a load bearing capacity of 5.80 lbs@0.5" W.C. and suitable for spray paint booths and/or sand blasting operations is a preferred type of filter media such as Supra 2 filter media from Columbus Industries, Ashville, Ohio. The media is suitable for use for sidewalls 33, top filter 35, and back filter 32. Different filter media 37 having different load bearing capacity and size ratings may be used for different service requirements while staying within the spirit and scope of the present invention.

FIG. 2 also shows an alternate embodiment of control system 10 in which front wall 38 extends between back filter 32 and fans 34. Front wall 38 extends from chamber top 25 to chamber floor 26 and to each of sidewalls 23 to form fan compartment 40. Vents 38a are placed with wall 38 to control the speed and volume of air flow from airway 24 to fan compartment 40. In an alternate embodiment, the outer walls of compartment 40 may be provided with vents 29 to allow outside air to be drawn into fans 34 to control air flow form filter assembly 30 and reduce wear on fans 34. in a preferred embodiment, compartment 40 is explosion proof meaning explosion proof components, such as fans, switches, manometers, and wiring are used in fabricating the exhaust system. Such explosion proof components are well known to those having skill in the art.

Figure 3:
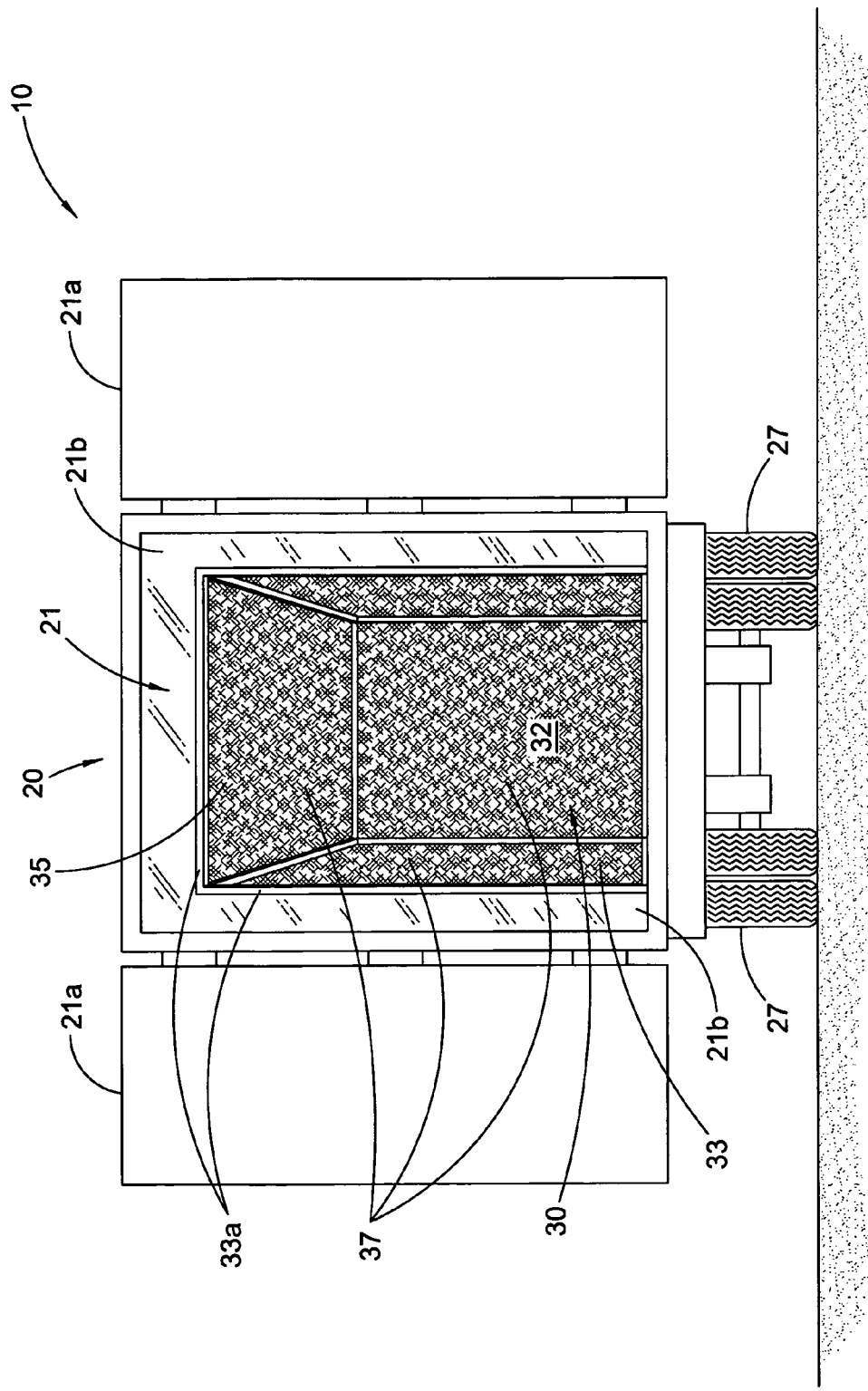
FIG. 3 is a rear view of the control system of the present invention taken from the open end of the outer chamber.

FIG. 3 is a rear view of control system 10 taken from the open end of chamber 20. This view is similar, if not identical to, the view from an exterior structure that would be functionally attached to control system 10. By functional attachment is meant that the attachment or connection between two or more components, for example, control chamber 20 and exterior structure 50 (described below) enables those components to perform particular functions. For example the functional attachment between control chamber 20 and exterior structure 50 enables the movement of air from exterior structure 50 into filter assembly 30. Doors 21a are depicted and function to close open door end 21 when desired. Cap 21b closes the open area around filter assembly 30 at door end 21. Cap 21b acts to prevent unfiltered air from entering airway(s) 24 (not shown in FIG. 3) that are located behind cap 21b. Filter assembly 30 is seen to taper or narrow in area as side filters 33 and top filter 35 extend to back filter 32.

Figure 4:
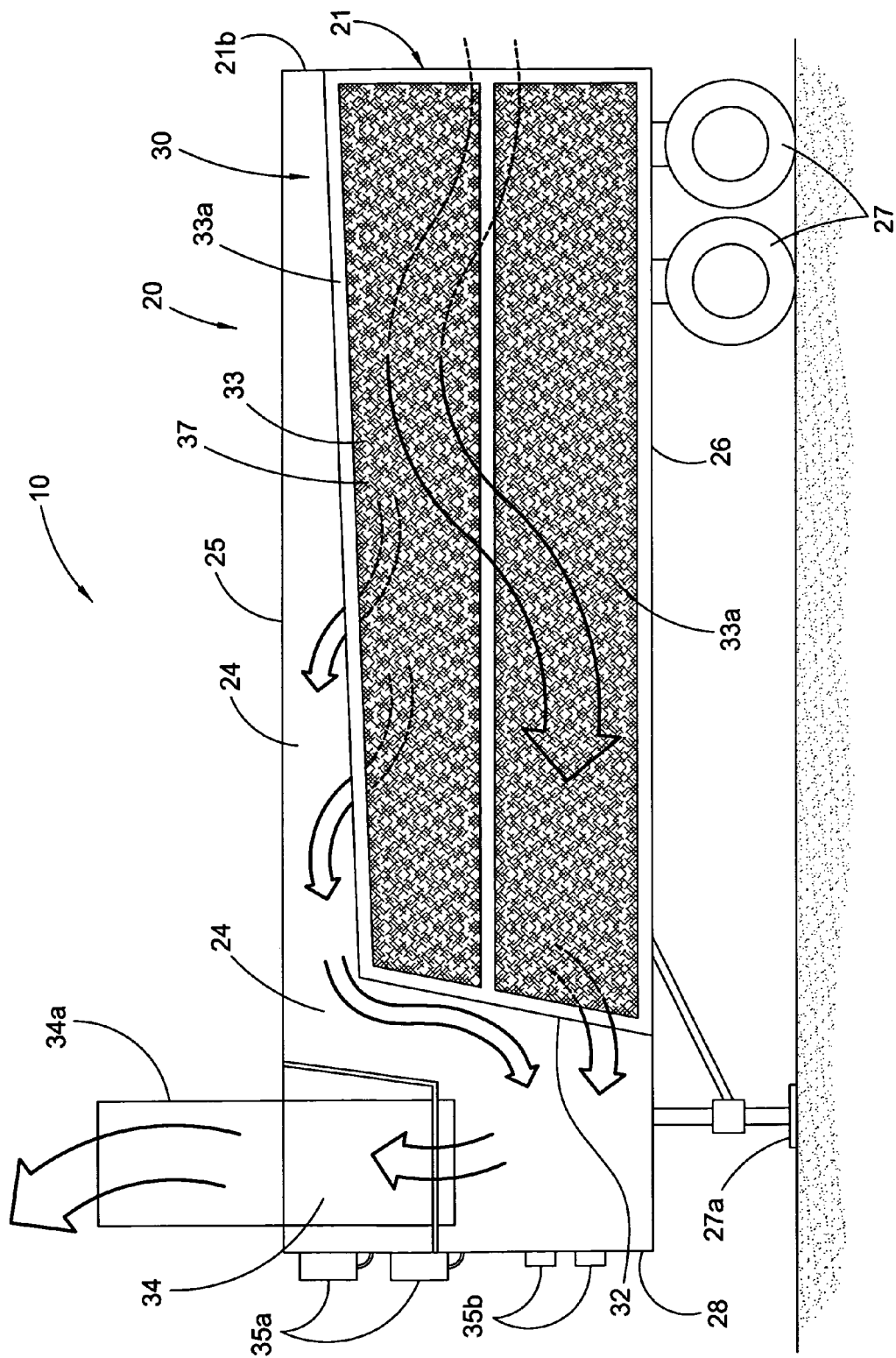
FIG. 4 is a side view of the control system of the present invention showing the flow of air through the system.

FIG. 4 is a side view of control system 10 showing the flow of air through the system. Shaded lines indicate the portion of the air stream within filter assembly 30, while the solid lines indicate the portion outside filter assembly 30 and within air way 24. In FIG. 4, the arrows indicate the path of the air pulled into filter assembly 30 by fan(s) 34. Air enters through open door end 21 and is diverted into filter assembly 30 by cap 21b. Solid cap 21b prevents air from directing entering air way 24 directly from an attached exterior structure or the outside by forcing it to pass through filters, 33, 32, and 35. The tapered shape of filter assembly 30 makes airway 24 larger by providing for more volume on the downstream side of the filters. This gives the advantage of creating a more even flow through the entire volume of filer assembly 30 and control system 10. It can be seen that the filtered air is pulled into fan(s) 34 and exhausted out to the exterior of chamber 20.

Figure 5:
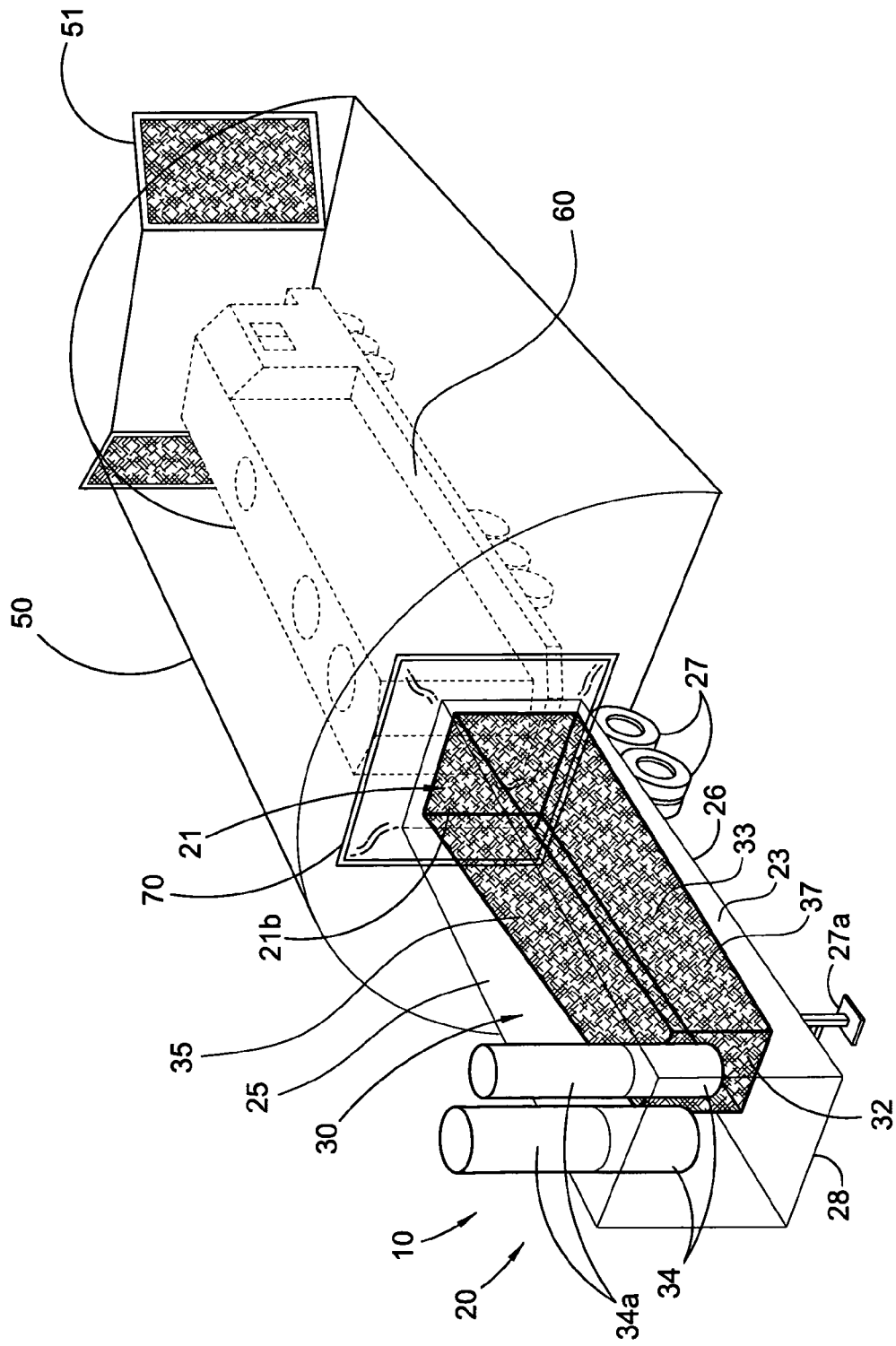
FIG. 5 is a top perspective view of the control system functionally attached to an exterior structure.

FIG. 5 is a top perspective view of control system 10 functionally attached to exterior structure 50 ("structure 50"). Structure 50 houses work piece 60 in shaded lines which is the object to be spray painted, sand blasted, cleaned, etc. While work piece 60 is a locomotive engine in the example shown, persons of skill in the art will recognize that any type of work piece(s) may be serviced using control system 10. Other examples include trucks, planes, storage tanks, rail cars, etc. Work piece 60 is moved into structure 50 through door(s) 51. Preferably, door 51 is vented or constructed to act as an air intake to allow outside air to be drawn into structure 50 by fans 34. Alternatively, one or more different air intakes may be used in place of or in conjunction with door 51. Structure 50 may be a permanent building that house a work piece. Alternatively, it may be a temporary structure built specifically to house a target work piece or built around a work piece that may be impossible, impractical, or too inexpensive to move.

Figure 5A:
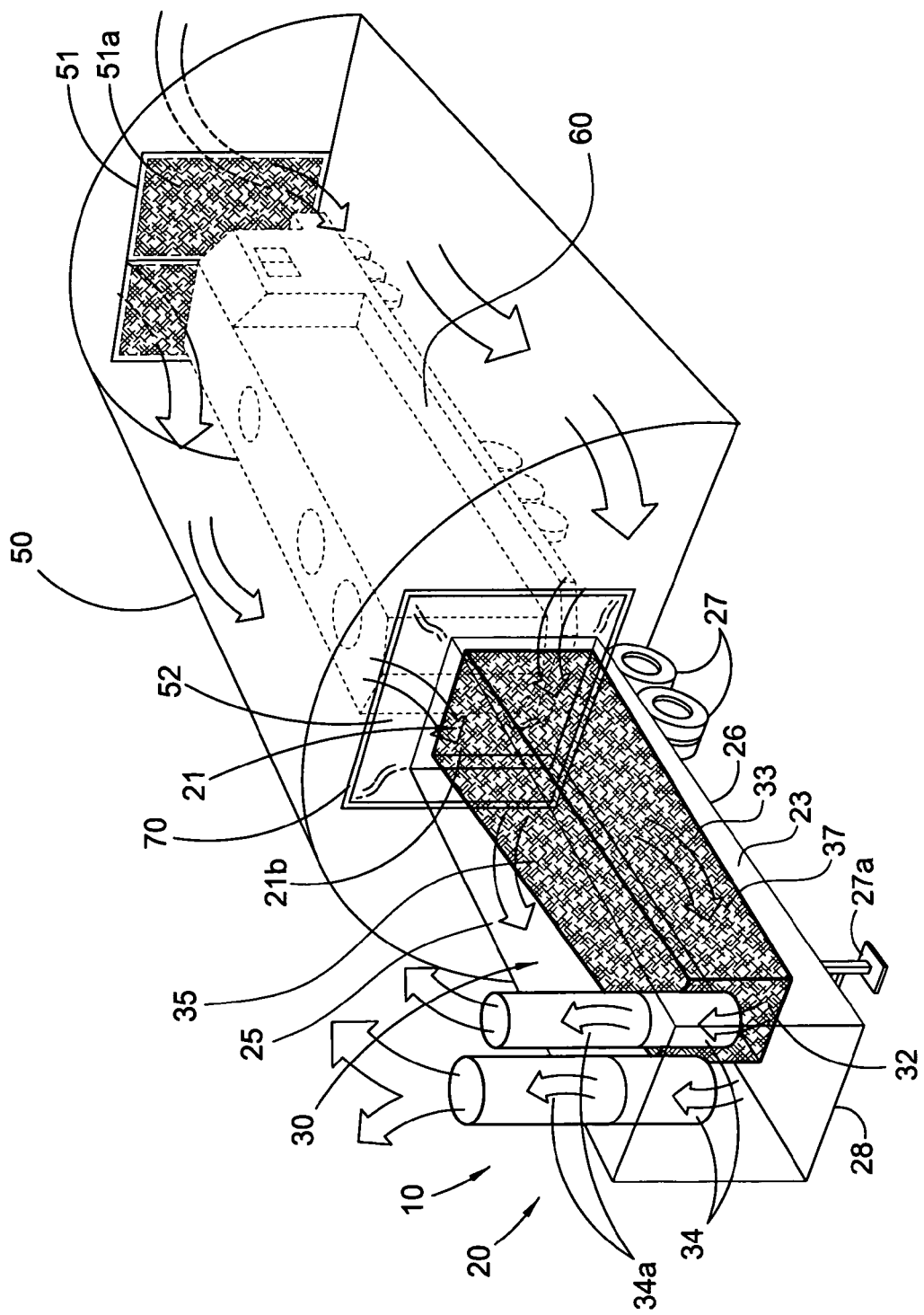
FIG. 5A is top perspective view similar to that seen in FIG. 5 showing air flow over and around a work piece when the control system is in operation.

FIG. 5A is an identical view as in FIG. 5 with the exception that doors 51 are closed and also contain filters 51a. When spray painting, cleaning operations, or other activity commences, fan(s) 34 are turned on to draw air from upstream of the target item so that the air flows around the target item and into chamber. In the embodiment shown in FIG. 5A, the arrows depict air flow entering structure 50 from upstream of work piece 60 and flowing over and around work piece 60. The air flow, carrying air borne particulate generated by the operations performed on work piece 60, then passes into filter assembly 30 where the particulates are caught and retained by filters 32, 33 and 35. The filtered air moves through the filters into airways 24. Use of airways 24 provides the unexpected advantage of a wider flow of air which enables the contaminants to be deposited evenly over the broad surface of each of filters 32, 33 and 35. This advantage is enhanced by the tapering of side filters 33 and top filter 35 toward each other and back filter 32 as they extend from door end 21 toward front wall 28 of chamber 20. This convergence causes airway 24 to widen from door end 21 to front wall 28.

Preferably, the functional attachment between structure 50 and control chamber 20 is a sealing attachment. By sealing attachment or sealingly attached is meant an attachment between two structures or components that restricts or prevents the intake of air or fluid into control system 10 from outside the two attached structures. Seal 70 is constructed between door end 21 and air flow exit opening 52 of structure 50. Preferably, seal 70 is designed to direct the air flow from structure 50 and into filter assembly 30. More preferably, seal 70 also prevents outside air from entering into filter assembly 30.

Figure 6A:
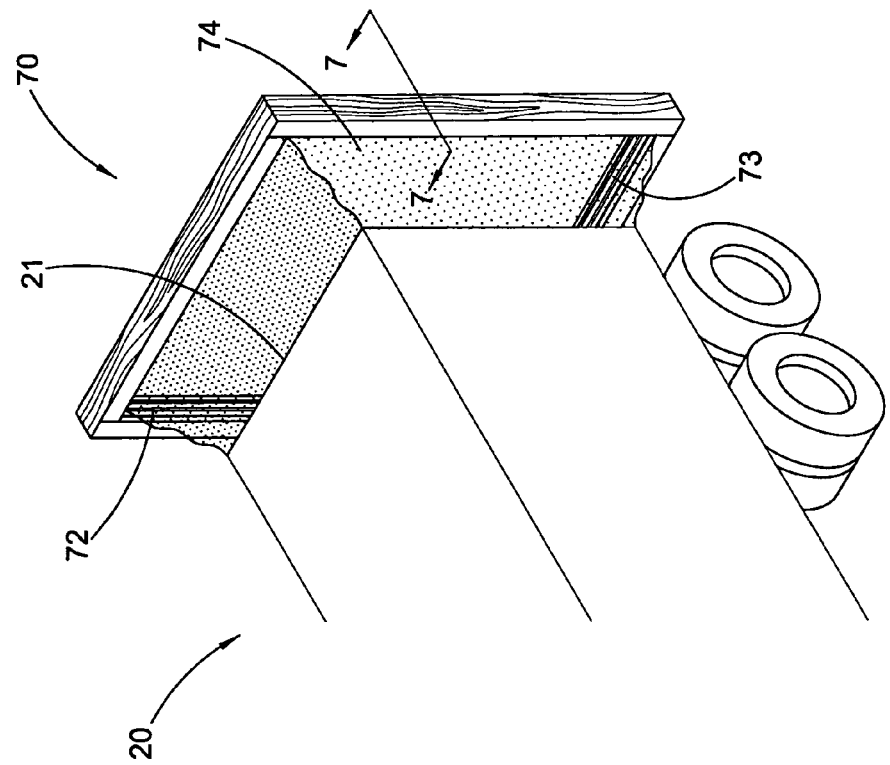
FIG. 6A is a similar view as FIG. 6 showing the assembled seal.
Figure 6:
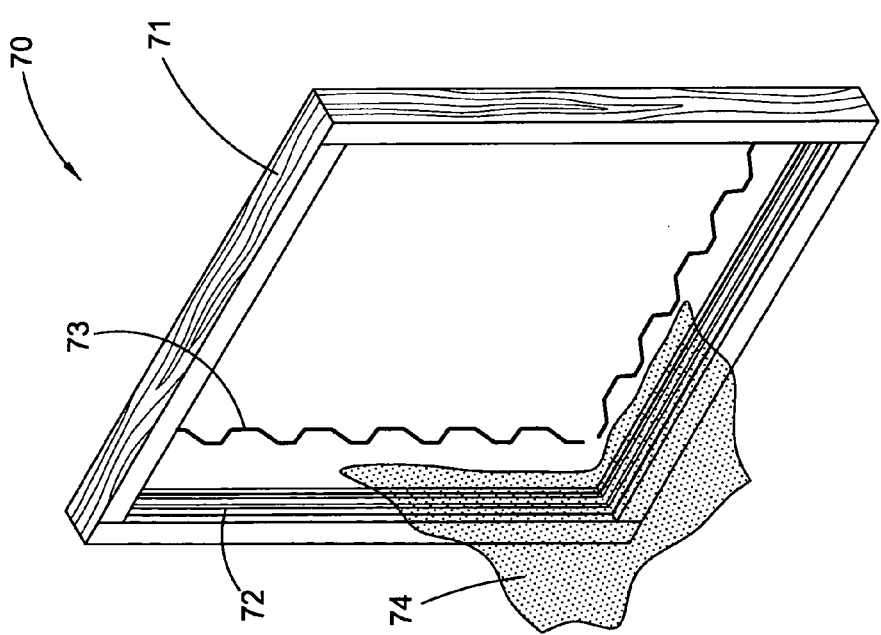
FIG. 6 is a top perspective view of the disassembled seal between the control system and an exterior structure.

FIG. 6 is a top perspective view of disassembled seal 70. In one embodiment, frame 71 is formed around opening 52 of exterior structure 50 (not seen in FIG. 6). C-channel 72 is placed within frame 71. Shroud 74 is placed with c-channel 72. A biasing component, such as zigzag spring 73 ("spring 73"), is preferably placed within c-channel 72 in such a way as to hold shroud 74 in place while air currents pass within the enclosed seal 70 from exterior structure 50 to filter assemble 30 as seen in FIG. 6A. Shroud 74 may be fabricated from plastic film or sheets, such as HDPE, canvas, or other suitable material. Preferably, seal 70 is constructed as shown in FIG. 6A in that it encloses all sides of the passage between exterior structure 50 and chamber 20.

Figure 6B:
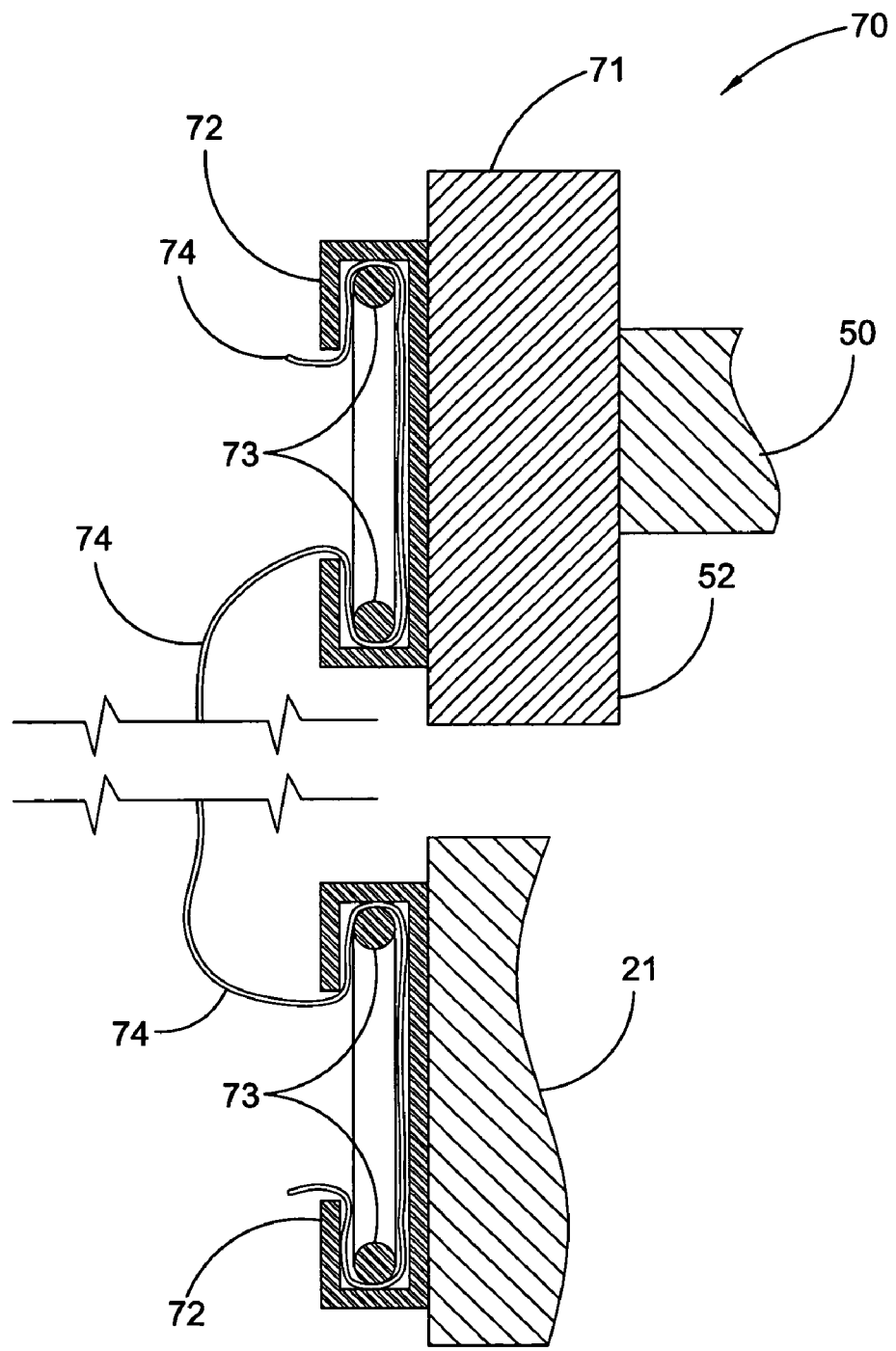
FIG. 6B is a cross section of the seal taken along line 7-7 of FIG. 6A; and, FIG. 7 is a schematic top view of an alternate embodiment of the airborne contaminant control system of the preset invention.

FIG. 6B is a cross section of seal 70 taken along line 7-7 of FIG. 6A. Frame 71 is seen fixed to exterior structure 50 with c-channel 72 attached to frame 71. C-channel may be fixedly or removably attached depending on the needs of the user. Spring 73 is seen within c-channel 72 holding shroud 74. The opposite side of shroud 74 is held in a similar fashion at end 21 of outer chamber 20. It will be recognized that the configuration of seal 70 seen in FIGS. 6, 6A, and 6B is one embodiment of a seal that is easily constructed and allows passage of the air flow into control system 10 from exterior structure 50 while still preventing outside air from entering the system. Persons of skill in the art will recognize that other seal constructions may be used to direct air flow from exterior structure 50 into filter assembly 30 while still preventing unfiltered outside air from entering filter assembly 30.

Figure 7:
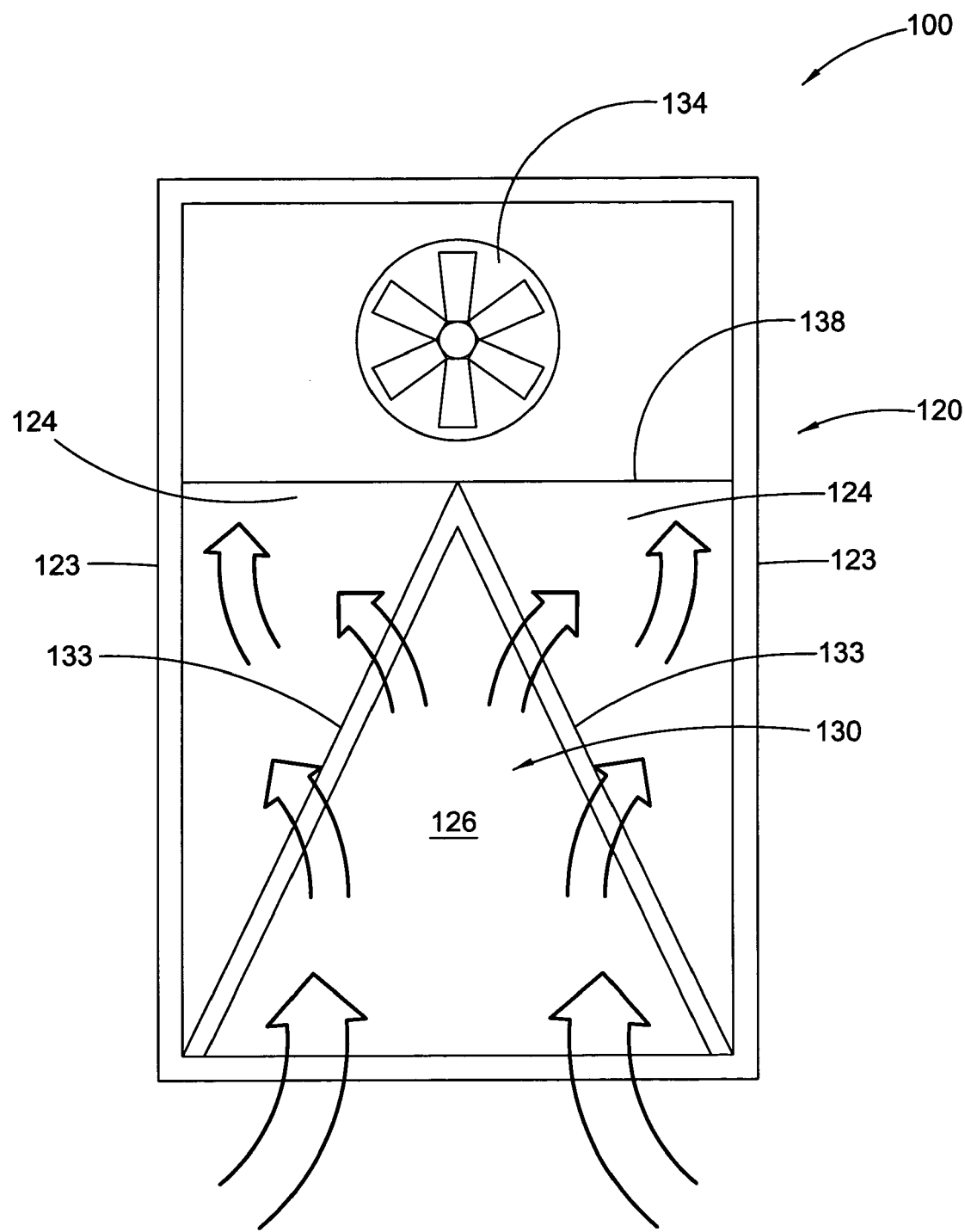

FIG. 7 is a schematic top view of an alternate embodiment of control system 10 of the present invention. In this alternate embodiment, mobile air contaminant control system 100 ("control system 100") includes chamber 120 which encloses filter assembly 130 and fan(s) 134. Chamber 120 includes side walls 123, roof 123 (not shown), and floor 126. Side filters 133 of filter assembly 130 are tapered so as to converge to form a v-shaped structure with the back filter of control system 10 discussed above removed. Airways 124 are seen downstream from side filters 133 similar to control system 10. In one embodiment of the structure depicted in FIG. 7, a top filter (not shown) is functionally attached to side filters 133. Side filters contact floor 126 of container 120. In the embodiment shown, wall 138 is shown between filters 133 and fan(s) 135 to form a fan compartment. Wall 138 may extend from floor 126 to the chamber roof and between sides 123 or may enclose fan(s) 135 without extending across the complete cross section of chamber 120. The v-shape of filter assembly 130 provides the similar advantages as those supplied by the tapered shape of filter assembly 30 discussed above in that it allows for an increased volume for airways 124. Similar, to outer chamber 20 discussed above, outer chamber 120 is preferably operationally attached to wheels to make whole of control system 100 mobile. The embodiment seen in FIG. 7 is useful with smaller outer chambers as it provides a greater volume for airways 124 thereby enabling more even flow through and loading of filters 133. It will be recognized that preferably a seal between an exterior structure and system 100 similar to seal 70 described above, is preferred when using system 100.

Thus it is seen that the objects of the invention are efficiently obtained, although changes and modifications to the invention should be readily apparent to those having ordinary skill in the art, which changes would not depart from the spirit and scope of the invention as claimed.

I claim:

1. A mobile airborne contaminant control system comprising:
   an outer chamber including a front wall, a roof, a floor and at least two side walls and possessing a fan end and a door end opposite said fan end, said outer chamber enclosing:
      an intake filter system including:
         a top filter:
         a plurality of side filters, at least two of said plurality of side filters attached to said top filter and at least two of said plurality of side filters contacting said floor of said outer chamber; and,
         a back filter opposite said door end and functionally attached to said top filter and said plurality of side filters;
         wherein said intake filter system includes a tapered shape with the narrow end of said tapered shape proximate to said back filter and the wide end of said tapered shape proximate to said door end;
   at least one airway formed downstream from said filter system between said intake filter system and said outer chamber;
   at least one fan, said at least one fan located between said back filter and said fan end;
   at least one air exhaust system extending from at least one of said at least one fan and directing exhaust air from said at least one fan to the exterior of said outer chamber; and,
   at least two wheels operatively attached to said floor.

2. The mobile airborne contaminant control system as recited in claim 1 wherein said intake filter system is straight.

3. The mobile airborne contaminant control system as recited in claim 1 further comprising an exterior structure functionally attached to said door end.

4. The mobile airborne contaminant control system as recited in claim 3 wherein said functional attachment is a seal assembly.

5. The mobile airborne contaminant control system as recited in claim 1 further comprising a seal assembly to form a seal between said door end and an opening of an exterior structure.

6. The mobile airborne contaminant control system as recited in claim 1 wherein said back filter is removed and said top filter and said plurality of side filters form a v-shaped configuration.

7. The mobile airborne contaminant control system as recited in claim 1 further comprising a front wall between said at least one fan and said intake filter system, said front wall extending between said roof and said floor of said outer chamber and between said at least side walls of said outer chamber to form an enclosed fan compartment.

8. The mobile airborne contaminant control system as recited in claim 7 wherein said fan compartment is explosion proof.

9. The mobile airborne contaminant control system as recited in claim 1 further comprising at least one door sized to enclose said door end.

10. The mobile airborne contaminant control system as recited in claim 3 wherein said exterior structure comprises at least one air intake.

11. The mobile airborne contaminant control system as recited in claim 10 wherein said at least one of said at least one air intakes is an opening for a door.

12. The mobile airborne contaminant control system as recited in claim 11, wherein said door includes a filter to filter intake air or fluid passing through said opening.

13. The mobile airborne contaminant control system as recited in claim 1 wherein said filters range in size from greater than zero microns to about 10 microns.

14. The mobile airborne contaminant control system as recited in claim 1 wherein said top and side filters are supported by a framework.

15. A mobile airborne contaminant control system comprising:
an outer chamber including a front wall, a roof, a floor and at least two side walls and possessing a fan end and a door end, said outer chamber enclosing:
an intake filter system including:
a top filter:
a plurality of side filters, at least two of said plurality of side filters attached to said top filter and at least two of said plurality of side filters contacting said floor of said outer chamber; and,
a back filter opposite said door end and functionally attached to said top filter and said plurality of side filters;
wherein said intake filter system includes a tapered shape with the narrow end of said tapered shape proximate to said back filter and the wide end of said tapered shape proximate to said door end;
at least one airway formed downstream from said filter system between said intake filter system and said outer chamber;
at least one fan, said at least one fan located between said back filter and said fan end;
at least one exhaust system extending from each said at least one fan and directing exhaust air from said at least one fan to the exterior of said outer chamber;
at least two wheels operatively connected to said floor; and,
an exterior structure functionally attached to said outer chamber.

16. The mobile airborne contaminant control system as recited in claim 15 wherein said intake filter system is straight.

17. The mobile airborne contaminant control system as recited in claim 15 wherein said functional attachment is a seal assembly forming a seal between said door end and an opening of said exterior structure.

18. The mobile airborne contaminant control system as recited in claim 15 wherein said back filter is removed and said top filter and said plurality of side filters form a v-shaped configuration.

19. The mobile airborne contaminant control system as recited in claim 15 further comprising a front wall between said at least one fan and said intake filter system, said front wall extending between said roof and said floor of said outer chamber and between said at least side walls of said outer chamber to form an enclosed fan compartment.

20. The mobile airborne contaminant control system as recited in claim 19 wherein said fan compartment is explosion proof.

21. The mobile airborne contaminant control system as recited in claim 15 further comprising at least one door sized to enclose said door end.

22. The mobile airborne contaminant control system as recited in claim 15 wherein said exterior structure comprises at least one air intake.

23. The mobile airborne contaminant control system as recited in claim 22 wherein said at least one of said at least one air is an opening for a door.

24. The mobile airborne contaminant control system as recited in claim 23, wherein at least one of said at least one air intakes includes a filter.

25. The mobile airborne contaminant control system as recited in claim 15 wherein said filters range in size from greater than zero microns to about 10 microns.

26. The mobile airborne contaminant control system as recited in claim 15 wherein said top and side filters are supported by a framework.

27. A method for controlling airborne contaminates from a work piece comprising:
functionally attaching an airborne contaminate control chamber to an opening of an exterior structure wherein said exterior structure includes at least one air intake, said airborne contaminate control chamber comprising:
an outer chamber including a front wall, a roof, a floor and at least two side walls and possessing a fan end and a door end opposite said fan end, said outer chamber enclosing:
an intake filter system including:
a top filter:
a plurality of side filters, at least two of said plurality of side filters attached to said top filter and at least two of said plurality of side filters contacting said floor of said outer chamber; and,
a back filter opposite said door end and functionally attached to said top filter and said plurality of side filters;
wherein said intake filter system includes a tapered shape with the narrow end of said tapered shape proximate to said back filter and the wide end of said tapered shape proximate to said door end;
at least one airway formed downstream from said filter system between said intake filter system and said outer chamber;
at least one fan, said at least one fan located between said back filter and said fan end;
at least one exhaust system extending from at least one of said at least one fan and directing exhaust air from said at least one fan to the exterior of said outer chamber; and,
at least two wheels operatively connected to said floor;
moving said work piece into said exterior structure;
operating said at least one fan to generate an air flow from said exterior structure into said control chamber;
moving said air flow though said top and side filters into said at least one airway; and,
directing said air flow from said at least one airway through said at least one fan to the exterior of said control chamber and said exterior structure.

* * * * *